United States Patent Office 2,800,035
Patented July 23, 1957

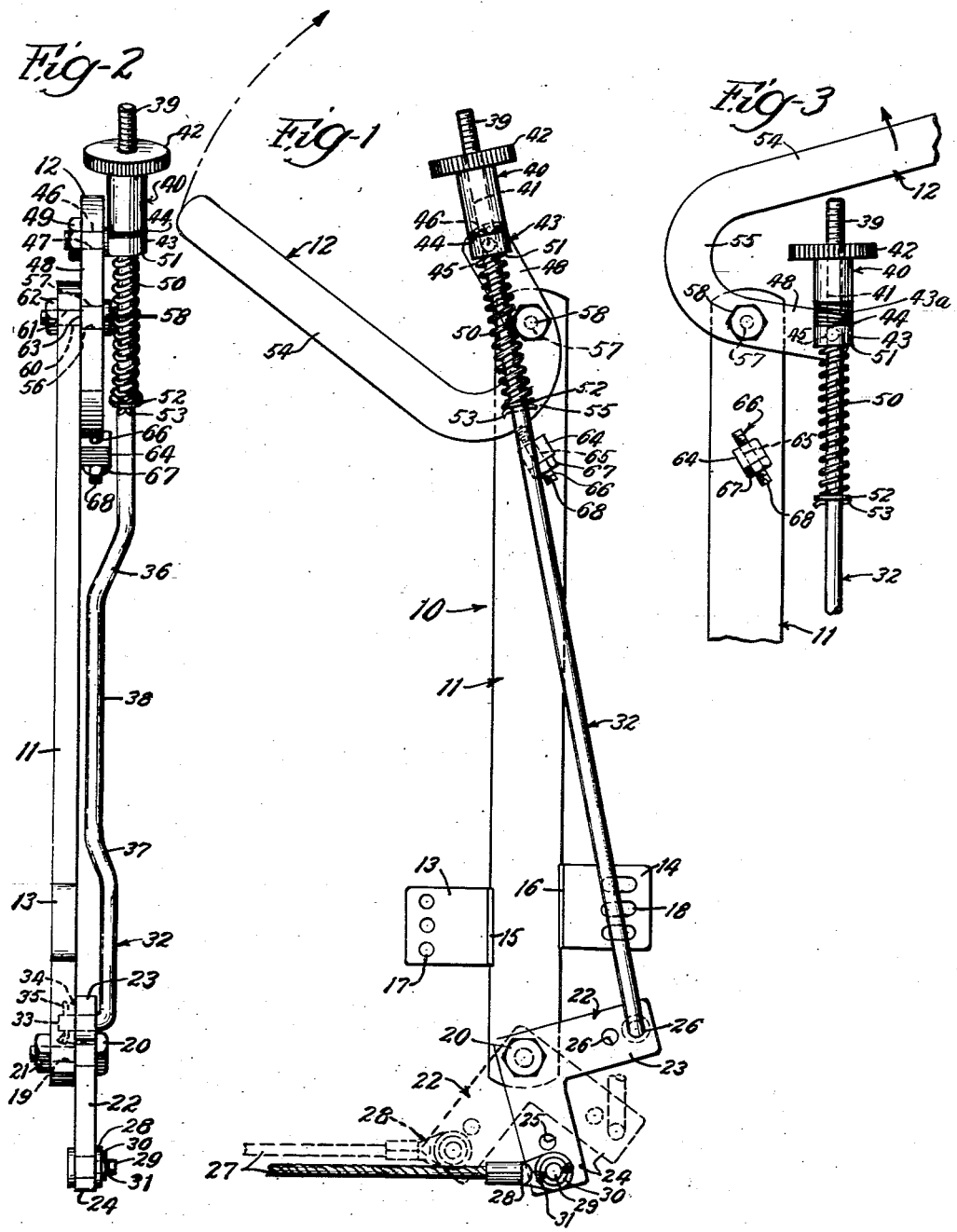

2,800,035

NON-RATCHET EMERGENCY BRAKE LEVERS

Eugene J. Miller, McHenry, Ill.

Application May 13, 1954, Serial No. 429,575

1 Claim. (Cl. 74—491)

The present invention relates to a non-ratchet emergency brake lever for automotive vehicles, and is particularly concerned with a mechanism for replacing the ratchet type of brake lever on trucks or vehicles which stand with the emergency brake applied for some time, while they are being loaded or unloaded.

The brakes which were held in fixed position by a pawl and ratchet in the devices of the prior art were not safe for this purpose, as the vibration or jiggling of the truck might loosen the brake and cause an accident.

One of the objects of the invention is the provision of a simplified brake controlling mechanism for emergency brakes of trucks or the like, which is positively secured in the "on" position or the "off" position with practically no possibility of release of the brakes by vibration or any action except the intentional release.

Another object of the invention is the provision of such an improved brake mechanism which may be used on many different kinds of trucks, and in which the amount of pull on the emergency brake and the braking action may be adjusted while the brake is on or off.

Another object of the invention is the provision of a simple type of mechanism of the class described, which is adapted to be manufactured cheaply, which has a minimum number of parts, and which may be used for a long time without repair or replacement of any of its parts.

Another object of the invention is the provision of such a brake mechanism in which the factor of safety as well as the amount of braking action may be adjusted.

Other objects and advantages of the invention will be apparent from the following description and the accompanying drawings, in which similar characters of reference indicate similar parts throughout the several views.

Referring to the single sheet of drawings accompanying this specification,

Fig. 1 is a side elevational view of an emergency brake controlling mechanism embodying the invention, showing the brake lever in full lines in the "brake on" position, with a portion of the mechanism in dotted lines in the "brake off" position;

Fig. 2 is a front elevational view;

Fig. 3 is a fragmentary side elevational view, showing the position which the controlling lever assumes when the brake is off.

Referring to Figs. 1 and 2, 10 indicates my emergency brake controlling mechanism in its entirety, and it is preferably mounted upon a supporting bar 11, serving as a column for bringing the actuating lever or handle 12 up into convenient position to be reached by the driver.

The column 11 may consist of a bar of steel, having a pair of supporting lugs 13, 14, butt welded at 15, 16 to the column 11, and provided with a plurality of apertures 17 or slots 18.

These lugs 13, 14 serve as attaching flanges for attachment of the mechanism to the chassis of the truck, and they adapt the mechanism to be mounted upon practically every modern make of truck.

At its lower end the column 11 is provided with a through bore 19 and a threaded screw bolt 20, having nut 21 for pivotally mounting a bell crank 22.

Bell crank 22 has two arms 23, 24, which may be at right angles to each other, and each arm is preferably provided with a plurality of through bores 25, 26, for adjustment of the range of motion of the mechanism in accordance with the various brake installations.

If a minimum amount of movement is required to set the brake band then the innermost aperture 25 may be employed on the arm 24, with the outermost aperture 26 on the arm 23.

For a maximum movement of the mechanism at the arm 24, the outermost aperture 25 should be employed on this arm, while the innermost aperture 26 on arm 23 should be employed.

The arm 24 is used for attachment to the usual emergency brake cable 27, leading to the brake band of the emergency brake of the truck or other automotive vehicle; and the cable is provided with the usual bifurcated eye fitting 28, pivotally secured to the bell crank arm 24, by a through bolt 29, with a washer 30 and cotter pin 31.

The bell crank 22 is preferably connected to the handle lever 12 by a connecting rod 32. This may consist of an elongated steel rod having a laterally turned end 33, adapted to pass through one of the apertures 26, where it is secured by means of a washer 34 and cotter pin 35.

The connecting rod 32 may be provided with a pair of off-sets 36 and 37, for locating its main body 38 near the column 11 and thus making it more compact.

The off-sets 36 and 37 provide the connecting rod 32 with a longitudinal resiliency, permitting it to give lengthwise sufficiently to pass dead center, as will be further described.

The upper end of the connecting rod 32 is threaded as indicated at 39, and provided with an elongated tubular nut 40, having a complementary threaded bore 41 and an enlarged knurled head 42.

The off-sets 36 and 37 in the connecting rod allow for installation of the mechanism in the manufacturer's original opening in the floorboards of the vehicle cab.

A combined slider and pivot member 43 engages the lower end 44 of the nut, and has a bore 45 for receiving the connecting rod 32.

Slider and pivot member 43 has a laterally projecting stub shaft 46, which is pivotally mounted in a bore 47 in the end portion 48 of lever 12, where the stub shaft 46 is secured by a nut 49 on its threaded end.

A helical coil spring 50 engages the lower end 51 of the slider and is coiled about the rod 32 and provided with a washer 52 and cotter pin 53, acting as an abutment for resisting the reaction of the spring which is under compression.

Spring 50 merely causes the slider 43 to engage the end of the nut 40 at all times.

The hand lever 12 may consist of a bar of steel of rectangular cross section, having a straight portion 54 and a U-shaped curved portion 55, and a relatively straight end portion 48.

The straight portion 48 is provided with a through bore 56 for receiving a pivot bolt 57, which has a head 58 and an enlarged portion fitting in the bore 56.

The pivot bolt 57 also has a reduced portion 60 passing through a smaller bore 61 in the column 11, where it is secured by nut 62. The column is clamped between the nut and the annular shoulder 63, leaving sufficient clearance between the head 58 and column 11 for free pivotal movement of the handle lever 12.

In some embodiments of the invention, as shown in Fig. 3, a heavy coil spring 43a may be placed between nut 40 and slider 43 to provide sufficient resiliency to permit the effective length of the rod 32 to change sufficiently to pass dead center.

In other brakes the strong compression spring used in the manufacturer's brake band may provide sufficient resiliency to permit the mechanism to go past dead center.

The column 11 is preferably provided with a fixed stop lug 64, welded to its face and provided with a threaded bore 65 for receiving the threaded screw bolt 66, which has a lock nut 67 and a kerf 68 in its end.

Lug 64 and stop screw 66 are located to engage the edge of the U-shaped curved portion 55 of the hand lever, and may be adjusted to determine how far hand lever 12 moves in a counterclockwise direction in Fig. 1.

The operation of the mechanism is as follows:

The cable 27 is of such length relative to the position of the column 11 on the chassis that the emergency brake is applied when the parts are in the full-line position of Fig. 1.

When the parts are in the position of Fig. 3 or the dotted-line position of Fig. 1, the brake is released because the bell crank 22 in the dotted-line position of Fig. 1 permits slack in the cable 27.

Assuming the brake is released, as in Fig. 3, when the operator wishes to apply the brake he may pull on the hand lever 12, pivoting this hand lever in a counterclockwise direction, as shown by the arrow in Fig. 3.

This causes the end portion 48 of the lever 12 to move counterclockwise in Fig. 3, exerting a pull on the connecting rod 32, which causes the bell crank 22 to move counterclockwise, placing a tension on the emergency brake cable 27.

The position of the nut 40 is so adjusted that all slack has been drawn up out of the cable 27, and cable 27 is tightly tensioned and the brake is set when the connecting rod 32 passes the axis of the pivot bolt 59.

Thereafter continued movement of the hand lever 12, toward the left to the position of Fig. 1, permits the connecting rod 32 to move downward a very small amount, which is not sufficient to release the brake; but thereafter the connecting rod 32, bell crank 22 and cable 27 tend to pull the hand lever 12 against the stop screw 66.

The tension of the emergency brake cable and associated parts tends to keep the hand lever in the locked position of Fig. 1, past dead center 57.

The straight portion 48 of the hand lever and the connecting rod 32 constitute a toggle, which is locked by the line of centers between the shaft 46 and the connecting rod end 33, passing the pivotal axis of the screw bolt 57.

In order to release the brake it is necessary to pull upward on the hand lever 12, in Fig. 1, against the brake and cable tension until the connecting rod 32 passes the center of pivot bolt 57, after which the brake will be released by gravity by means of the weight of the connecting rod 32, and later the weight of the handle 12, until the parts reach the position of Fig. 3.

The slider 43 is preferably provided with an upwardly projecting ridge and the nut 40 with a multiplicity of radial grooves in its lower end, as shown in Fig. 2, for maintaining the adjustment of the nut.

The amount of the brake tension and the tightness with which the brake may be set may be adjusted at any time, even after the brakes are on, by turning the nut 40 with its knurled flange 42.

The factor of safety of the mechanism depends somewhat on how far past dead center the lever 12 is permitted to move, and this may be adjusted by adjusting the stop screw 66 so that the hand lever 12 may pass well beyond dead center before it engages the stop screw 66.

The resiliency of the cable 27 and the off-sets 36, 37 permit the parts to be tensioned beyond that needed for setting the brakes, so that the tension may be slightly released after the hand lever passes dead center, so that it may reach the position of Fig. 1, where the connecting rod 32 and associated parts lock the mechanism in the "brake on" position.

The present brake controlling mechanism is absolutely safe, simple in construction, capable of economical manufacture, quickly moved to "on" or "off" position, and adapted to be used to outlast the life of any truck or any other vehicle to which it is attached.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

An emergency brake unit assembly for use with brakes having a cable for applying brake pressure comprising, an elongated metal frame member having an attaching bracket at its lower end for securement to the chassis, and having a bell crank lever pivotally mounted on its lower end, said bell crank having a pair of arms provided with a multiplicity of apertures in each arm, one arm being provided with a pivot bolt for attachment to an eye of a brake cable, and the other arm having a toggle rod provided with a laterally turned end pivoted in one of its apertures, the said toggle rod extending beyond the upper end of said frame member and being provided at its upper end with a threaded portion having a rotatable internally threaded member provided with a knurled rim flange, the said threaded member having its end opposite from the knurled rim flange provided with teeth, a metal collar slidably mounted on said rod and having complementary shallow teeth, said collar being provided with a pin for pivotal attachment to a J-lever at the smaller end of said J-lever, said J-lever having a pivotal attachment to the upper end of said frame member at a point slightly spaced from the short end of said J-lever, said rod also having a coil spring mounted beneath said collar and engaging a fixed washer and cotter pin at its other end for permitting the J-lever to pass dead center in the application of a pull to said cable, the longer end of said J-lever serving as a handle moving from a past dead-center position in which a pull is maintained on said cable to an opposite position in which the pull is relieved on said cable.

References Cited in the file of this patent

UNITED STATES PATENTS

| 489,997 | Sweet | Jan. 17, 1893 |
| 1,223,316 | Curtiss | Apr. 17, 1917 |
| 1,331,513 | Lindberg | Feb. 24, 1920 |
| 1,462,725 | Swan | July 24, 1923 |
| 1,472,358 | Edwards | Oct. 30, 1923 |
| 1,585,855 | Hawn | May 25, 1926 |
| 1,889,692 | Nelson | Nov. 29, 1932 |
| 2,024,792 | Anderson | Dec. 17, 1935 |
| 2,175,188 | Fuller | Oct. 10, 1939 |
| 2,274,288 | Arens | Feb. 24, 1942 |
| 2,531,740 | Orschelm | Nov. 28, 1950 |

FOREIGN PATENTS

| 42,967 | Sweden | Aug. 15, 1917 |